(12) United States Patent (10) Patent No.: US 7,399,954 B2
Venkatesh (45) Date of Patent: Jul. 15, 2008

(54) SYSTEM AND METHOD FOR AN OPTICAL NAVIGATION DEVICE CONFIGURED TO GENERATE NAVIGATION INFORMATION THROUGH AN OPTICALLY TRANSPARENT LAYER AND TO HAVE SKATING FUNCTIONALITY

(75) Inventor: Shalini Venkatesh, Santa Clara, CA (US)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 0 days.

(21) Appl. No.: 11/204,913

(22) Filed: Aug. 16, 2005

(65) Prior Publication Data

US 2007/0090279 A1 Apr. 26, 2007

(51) Int. Cl.
*G06M 7/00* (2006.01)
*H01J 40/14* (2006.01)

(52) U.S. Cl. ........... 250/221; 250/231.19; 345/166
(58) Field of Classification Search .......... 250/221, 250/231.19; 345/166
See application file for complete search history.

(56) References Cited

U.S. PATENT DOCUMENTS

| | | | |
|---|---|---|---|
| 3,881,819 A | 5/1975 | Hirabayashi et al. |
| 4,168,906 A | 9/1979 | Schwiesow |
| 4,294,544 A | 10/1981 | Altschuler et al. |
| 4,311,990 A * | 1/1982 | Burke | ............... 341/31 |
| 4,470,696 A | 9/1984 | Ballard |
| 4,553,842 A | 11/1985 | Griffin |
| 4,664,513 A | 5/1987 | Webb et al. |
| 4,751,380 A | 6/1988 | Victor et al. |
| 4,794,384 A | 12/1988 | Jackson |
| 4,857,903 A | 8/1989 | Zalenski |
| 5,103,106 A | 4/1992 | Golberstein |
| 5,212,535 A | 5/1993 | Miyazaki et al. |
| 5,229,830 A | 7/1993 | Ishida et al. |
| 5,260,761 A | 11/1993 | Barker |
| 5,578,813 A | 11/1996 | Allen et al. |
| 5,587,785 A | 12/1996 | Kato et al. |
| 5,589,858 A | 12/1996 | Kadowaki et al. |

(Continued)

FOREIGN PATENT DOCUMENTS

CN 1360275 A 7/2002

(Continued)

OTHER PUBLICATIONS

Chinese Office Action dated Mar. 16, 2007 involving Chinese Application No. 200410070345.0 (co-pending application).

(Continued)

*Primary Examiner*—Georgia Y. Epps
*Assistant Examiner*—Seung C. Sohn

(57) ABSTRACT

A method and system for an optical navigation device configured to generate navigation information through a transparent layer. Specifically, the optical navigation device includes a light source that is configured to illuminate a reflective surface through a layer that is optically transparent to the light source. A sensor is configured to generate navigation information in response to light reflecting off the reflective surface. The sensor is configured with a depth of field to support a distance between the sensor and the reflective surface. A contact sensor is also included to indicate when the optical navigation device is no longer in contact with the transparent layer. The contact sensor allows for skating functionality for the optical navigation device.

18 Claims, 4 Drawing Sheets

U.S. PATENT DOCUMENTS

| | | | |
|---|---|---|---|
| 5,644,139 A | 7/1997 | Allen et al. | |
| 5,654,736 A | 8/1997 | Green et al. | |
| 5,729,009 A | 3/1998 | Dandliker et al. | |
| 5,786,804 A | 7/1998 | Gordon | |
| 6,069,700 A | 5/2000 | Rudnick et al. | |
| 6,219,143 B1 | 4/2001 | Lindsay et al. | |
| 6,219,145 B1 | 4/2001 | Gutierrez et al. | |
| 6,220,686 B1 | 4/2001 | Ludi et al. | |
| 6,222,174 B1 | 4/2001 | Tullis et al. | |
| 6,246,482 B1 | 6/2001 | Kinrot et al. | |
| 6,256,016 B1 | 7/2001 | Piot et al. | |
| 6,268,599 B1 * | 7/2001 | Chen et al. | 250/208.6 |
| 6,281,882 B1 | 8/2001 | Gordon et al. | |
| 6,373,047 B1 | 4/2002 | Adan et al. | |
| 6,424,407 B1 | 7/2002 | Kinrot et al. | |
| 6,433,780 B1 | 8/2002 | Gordon et al. | |
| 6,442,725 B1 | 8/2002 | Schipke et al. | |
| 6,525,306 B1 | 2/2003 | Bohn | |
| 6,621,483 B2 * | 9/2003 | Wallace et al. | 345/157 |
| 6,642,506 B1 | 11/2003 | Nahum et al. | |
| 6,690,474 B1 | 2/2004 | Shirley | |
| 6,707,027 B2 | 3/2004 | Liess et al. | |
| 6,741,335 B2 | 5/2004 | Kinrot et al. | |
| 6,747,284 B2 | 6/2004 | Bohn | |
| 6,934,037 B2 | 8/2005 | DePue et al. | |
| 7,019,733 B2 * | 3/2006 | Koay | 345/163 |
| 7,116,427 B2 | 10/2006 | Baney et al. | |
| 7,161,682 B2 | 1/2007 | Xie et al. | |
| 7,189,985 B2 | 3/2007 | Xie et al. | |
| 2002/0080117 A1 | 6/2002 | Son et al. | |
| 2002/0080121 A1 | 6/2002 | Son | |
| 2002/0175274 A1 | 11/2002 | Black | |
| 2004/0001270 A1 | 1/2004 | Leigh et al. | |
| 2004/0061502 A1 * | 4/2004 | Hasser | 324/332 |
| 2004/0113890 A1 * | 6/2004 | Ranta | 345/166 |
| 2004/0189593 A1 | 9/2004 | Koay | |
| 2004/0227954 A1 | 11/2004 | Xie | |
| 2005/0024623 A1 | 2/2005 | Xie et al. | |
| 2005/0057523 A1 * | 3/2005 | Moyer | 345/173 |
| 2005/0073544 A1 | 4/2005 | Scofield et al. | |
| 2005/0111104 A1 | 5/2005 | Tseng | |
| 2005/0156876 A1 * | 7/2005 | Kong | 345/156 |
| 2005/0231482 A1 * | 10/2005 | Theytaz et al. | 345/166 |
| 2005/0264531 A1 * | 12/2005 | Tai et al. | 345/163 |
| 2006/0091298 A1 * | 5/2006 | Xie et al. | 250/221 |
| 2006/0187208 A1 * | 8/2006 | Wenstrand et al. | 345/166 |
| 2007/0008286 A1 * | 1/2007 | Theytaz et al. | 345/166 |

FOREIGN PATENT DOCUMENTS

| | | |
|---|---|---|
| CN | 2560031 Y | 7/2003 |
| JP | 2004151927 * | 5/2004 |
| WO | WO 99/46603 A1 | 9/1999 |
| WO | WO 02/17222 A2 | 2/2002 |
| WO | WO 2004/059613 A1 | 7/2004 |

OTHER PUBLICATIONS

English Translation of Chinese Office Action dated Mar. 16, 2007 involving Chinese Application No. 200410070345.0 (co-pending application).

Barkas, W.W., "Analysis of Light Scattered From A Surface Of Low Gloss Into Its Specular And Deffuse Components", Proc. Phys. Soc., vol. 51, 1939, pp. 274-295.

Malacara, D., "Optical Shop Testing", Wiley-Interscience, ISBN 0471522325, 2nd Ed., Jan. 1992 Table of Contents for Chapters 1-7.

Siegman, A. E., "Lasers", University Science Books, 1986, pp. 54-55.

Snadden, M.J. "Injection-locking Technique For Heterodyne Optical Phase Locking Of A Diode Laser", Optics Letters, vol. 22, No. 12, Jun. 15, 1997, pp. 892-894.

Wyant, J., "White Light Extended Source Shearing Interferometer", Applied Optics, vol. 13, No. 1, Jan. 1974, pp. 200-202.

* cited by examiner

SYSTEM AND METHOD FOR AN OPTICAL NAVIGATION DEVICE CONFIGURED TO GENERATE NAVIGATION INFORMATION THROUGH AN OPTICALLY TRANSPARENT LAYER AND TO HAVE SKATING FUNCTIONALITY

RELATED UNITED STATES PATENT APPLICATIONS

This Application is related to U.S. patent application, Ser. No. 10/680,525, by Tong Xie and Marshall T. DuPue, filed on Oct. 6, 2003, entitled "Method and Device for Optical Navigation", and assigned to the assignee of the present invention, which is hereby incorporated herein by reference in its entirety.

This Application is related to U.S. patent application, Ser. No. 10/977,720 by Tong Xie, Marshall T. DuPue, and Susan Hunter, filed on Oct. 30, 2004, entitled "Tracking Separation Between an Object and a Surface Using a Reducing Structure", and assigned to the assignee of the present invention, which is hereby incorporated herein by reference in its entirety.

TECHNICAL FIELD

The various embodiments of the present invention relate to the field of motion sensing devices. More specifically, various embodiments of the present invention relate to a system and method for an optical navigation device having skating functionality that is capable of operating over a transparent layer.

BACKGROUND ART

Optical relative motion detection devices (hereinafter referred to as the "optical navigation device") typically utilize image correlation techniques to determine relative motion between the navigation device and a surface by capturing images of the surface as the navigation device passes over the surface or as the surface moves past the navigation device. Both the displacement and the direction of the relative motion of the navigation device with respect to the surface are determined by comparing one image with the following image.

Typically, light emitted by a source (e.g., light emitting diode or laser) within the optical relative motion detection device is reflected off a surface and is captured by a light-sensitive imager within the optical navigation device. As the optical navigation device is moved, the optical pattern detected (e.g., direct image of the surface, interferogram, speckle pattern, etc.) changes correspondingly between frames. From the changes observed between successively captured frames, the changing positions of the mouse over the surface can be determined.

For instance, existing optical navigation devices obliquely illuminate the surface to be navigated. Height variations on the surface cast shadows described by geometrical ray optics. The size and contrast of the shadow pattern images depends in part on the type of surface over which the optical navigation device is tracked. However, in some cases where a surface that would normally have sufficient surface variability or texture (on an optical scale) for use with an optical navigation device is covered with second, transparent material (e.g., glass or similar material), the optical navigation device is unable to track variations in a surface that is essentially featureless on an optical scale. That is, light reflected off the top surface of this overlying material would not show the spatial variations that can be used for optical tracking. As a result, optical navigation devices operating over a transparent layer present operational challenges.

DISCLOSURE OF THE INVENTION

A method and system for an optical navigation device configured to generate navigation information through a transparent layer. Specifically, the optical navigation device includes a light source that is configured to illuminate a reflective surface through a layer that is optically transparent to the light from the light source. A sensor is configured to generate navigation information in response to light reflecting off the reflective surface. The sensor is configured with a depth of field to support a distance between the sensor and the reflective surface. A contact sensor is also included to indicate when the optical navigation device is no longer in contact with the transparent layer. The contact sensor allows for skating functionality for the optical navigation device.

BRIEF DESCRIPTION OF THE DRAWINGS

The above and other objects and advantages of the present invention will be more readily appreciated from the following detailed description when read in conjunction with the accompanying drawings, wherein.

BEST MODES FOR CARRYING OUT THE INVENTION

Figure 1:
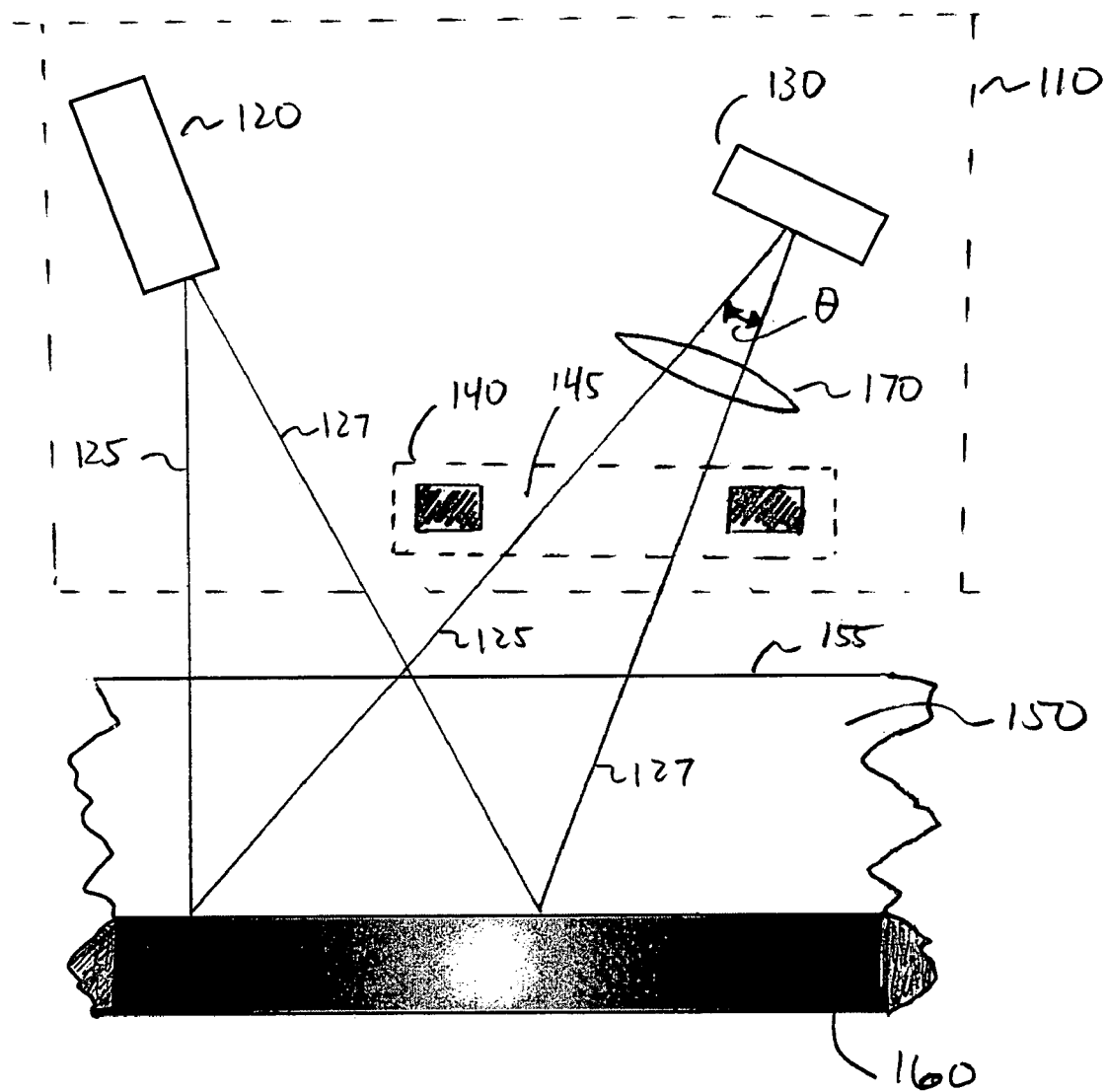
FIG. 1 is a diagram illustrating the path that light travels between a light source and a sensor of an optical navigation device over a transparent layer and a reflective surface, in accordance with one embodiment of the present invention.

Reference will now be made in detail to embodiments of the present invention, a system and method for an optical navigation device configured to generate navigation information through a transparent layer with skating functionality, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented in hardware running on a computer system that is an electronic imaging system, such as an optical navigation device or optical mouse for use with a computing system. This program is operable for processing image data for navigation purposes over a surface. In one embodiment, the imaging system includes a processor coupled to a bus and memory storage coupled to the bus. The memory storage can be volatile or non-volatile.

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "illuminating," or "detecting," or "generating," or "skating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Accordingly, embodiments of the present invention provide a method and system for generating navigation information through a transparent layer by an optical navigation device with skating functionality. As a result, other embodiments of the present invention serve the above purpose and provide for an optical navigation device having a greater depth of field and a contact sensor to allow for continuous tracking and skating functionality over reflective surfaces that may be covered by an optically transparent layer, such as glass.

Referring now to FIG. 1, a diagram illustrating an optical navigation device 110 that is capable of providing navigation information through a transparent layer is shown, in accordance with one embodiment of the present invention. The optical navigation device 110 provides continuous tracking and skating functionality, in accordance with embodiments of the present invention.

The optical navigation device 110 of FIG. 1 includes a light source 120, and a sensor 130. For purposes of clarity and brevity, only the light source 120 and the sensor 130 is included for the optical navigation device 110, however it is understood that other components (e.g., digital signal processor, imager, complementary metal oxide semiconductor [CMOS] imager, etc.) of the optical navigation device may be needed to provide imaging capability.

The light source 120 is configured to illuminate a reflective surface 160 that is underneath the optical navigation device 110. In some embodiments, the light source 120 is a light emitting diode (LED). In other embodiments, the light source is a laser (e.g., vertical cavity surface emitting laser [VCSEL]).

Further, the light source 120 illuminates the reflective surface through a layer 150 that is optically transparent to the light generated by the light source. That is, the transparent layer 150 (e.g., glass) does not reflect the light generated by the light source 120. For instance, the surface 155 of the transparent layer 150 is so smooth that there are no significant textual, surface features to produce optical reflections.

In addition, the sensor 130 is configured to generate navigation information in response to light from the light source 120 that is reflected off the reflective surface 160. For purposes of illustration, the sensor 130 may be a 1-dimensional (1-D) or 2-dimensional (2-D) sensor array that includes an array of individual photosensors that generate navigation information such as image information or spatial filtering information. Additionally, in one embodiment the sensor 130 may be a single sensor, such as a single photodiode.

FIG. 1 also depicts the path that the light from the light source 120 travels to reach the sensor 130. For instance, ray 125 is shown emanating from the light source 120, traveling through the transparent layer 150, reflecting off the reflective surface 160 and being received at the center of the sensor 130. In addition, ray 127 is shown emanating from the light source 120, traveling through the transparent layer 150, reflecting off the reflective surface 160 and being received at the center of the sensor 130. For purposes of illustration, rays 125 and 127 illustrate the illuminated boundaries of the light generated by the light source 120. That is, the light emanating from the light source is confined within the rays 125 and 127, for example. Correspondingly, the reflected light from the light source is confined between the rays 125 and 127 and define a collection angle θ (theta) of light received by the sensor 130.

The optical navigation device 110 includes one or more lenses 170 that act as collectors of the reflective light from the reflective surface 160. For example, the lenses act to focus the reflective light to the center of the sensor for further processing. More specifically, the sensor 130 is capable of forming an image of a portion of the reflective surface 160. The sensor continuously takes pictures or images of the reflective surface as the optical navigation device moves across the transparent layer and relative to the reflective surface.

The optical navigation device 110 is able to take pictures of the reflective surface quickly enough (e.g., 1500 pictures or frames per second is a typical rate) so that sequential pictures overlap. In this way, textual features of the reflective surface 160 are identified and tracked as the optical navigation device is moved relative to the reflective surface 160. The sensor is able to identify common features between two or more frames and determine the distance between them. This information is translated into X and Y coordinates to indicate mouse movement.

Additionally, FIG. 1 also illustrates a reducing structure 140 that includes an aperture 145 that is located in the optical path between the light source 120 and the sensor 130. The reducing structure 140 is configured to adjust the collection angle of the light that reflects off of the reflective surface 160.

In accordance with one embodiment, the optical navigation device 110 is configured with a depth of field that supports a distance between the sensor and the reflective surface 160. The depth of field is defined approximately as the range of distances at which the reflective surface 160 may be positioned and still give rise to a usable image at the receiving plane of the sensor 130. More specifically, one or more lenses in conjunction with the aperture 145 are designed to accommodate and support the depth of field of the optical navigation device 110. As such, the sensor is able to receive and process the light that is reflected off the reflective surface when the depth of field of optical navigation device 110, as influenced by the lenses and aperture 145, is great enough to accommodate the position of the reflective surface 160 in relation to the position of the sensor 130. In this way, the optical navigation device is able to accommodate the range of thicknesses of the smooth, transparent layer 150 (e.g., several millimeters in thickness).

For example, the appropriate size and position of the aperture 145, or even the removal of the aperture 145 provides the proper depth of field of the optical navigation device, in accordance with embodiments of the present invention. In other embodiments, the appropriate lens design in conjunction with the selected aperture design provides the proper depth of field. In this case, the light emitted from the mouse is able to pass through the transparent layer 150, reflect off the surface 160 and return through the transparent layer 150 to be captured and imaged at the plane of the sensor within the optical navigation device 110, so that the optical navigation device is able to provide continuous tracking over the reflective surface 160.

In addition, embodiments of the present invention are well suited to supporting a depth of field for the optical navigation device 110 that provides navigation information when the transparent layer 160 is not present. That is, the transparent layer 150 has a thickness of zero.

Figure 2A:
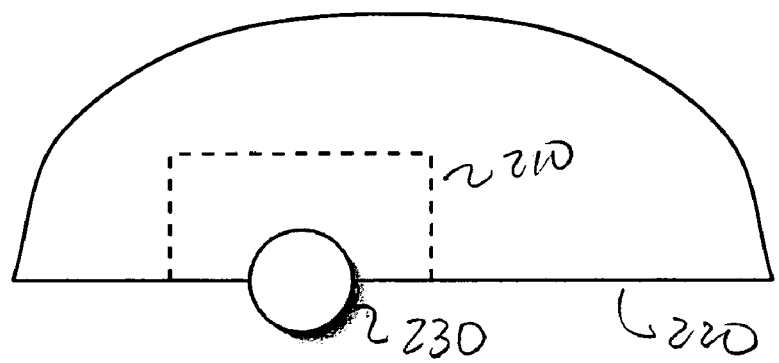
FIG. 2A is a diagram of a cross-section of an optical navigation device illustrating a contact sensor for determining when the optical navigation device is lifted off a surface, in accordance with one embodiment of the present invention.
Figure 2B:
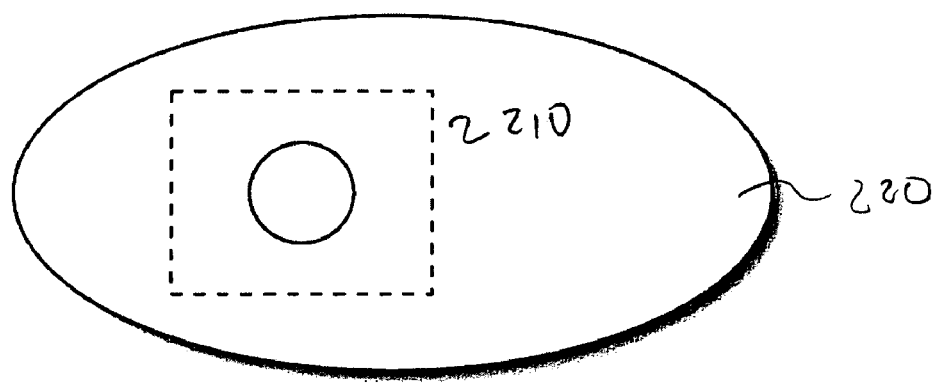
FIG. 2B is a diagram of a bottom perspective of an optical navigation device illustrating a contact sensor for determining when the optical navigation device is lifted off a surface, in accordance with one embodiment of the present invention.

FIGS. 2A, 2B are diagrams of the optical navigation device 110 that includes a contact sensor for providing skating functionality to the optical navigation device 110 of FIG. 1, in accordance with one embodiment of the present invention. The skating feature of the optical navigation device allows for tracking by the optical navigation device to be suspended when the optical navigation device is lifted off a corresponding surface. In the conventional art, skating of the optical navigation device is achieved by having a short, effective optical depth of field, so that optical signals of interest are lost when the optical navigation device is lifted off, for even a short distance, of the corresponding surface. However, the transparent layer poses a problem since the short, effective depth of field falls within the transparent layer, the surface beneath the transparent layer is no longer "seen", and as such, the conventional optical mouse with an insufficient depth of field is rendered useless. However, embodiments of the present invention are able to provide the skating functionality through the use of a contact or proximity sensor, as will be described below.

FIG. 2A is a diagram of a cross-section of an optical navigation device 110 illustrating a contact sensor 210 for determining when the optical navigation device is lifted off a surface, in accordance with one embodiment of the present invention. As shown in FIG. 2A, the contact sensor 210 is incorporated into the design of the optical navigation device to indicate when the optical navigation device is lifted off a corresponding surface. In addition, the contact sensor 210 is able to indicate when the optical navigation device is in contact with the corresponding surface. For instance, the position of the mechanical linkage 230 in relation to the bottom face 220 of the optical navigation device 110 indicates whether the optical navigation device is in contact with the corresponding surface.

FIG. 2B is a diagram of a bottom perspective of the optical navigation device 110 illustrating the contact sensor 210, in accordance with one embodiment of the present invention. The bottom face 220 is exposed in FIG. 2B and illustrates an exemplary position of the contact sensor 210. It is understood that the position of the contact sensor can be located at any point on the bottom face 220 of the optical navigation device, in accordance with embodiments of the present invention.

While embodiments of the present invention are discussed within the context of determining whether the contact sensor 210 indicates when the optical navigation device is in contact with a corresponding surface, other embodiments of the present invention are well suited to a contact sensor 210 that indicates whether the optical navigation device is in the proximity of the corresponding surface. In this case, the optical navigation device need not be in physical contact with the corresponding surface.

Figure 3A:
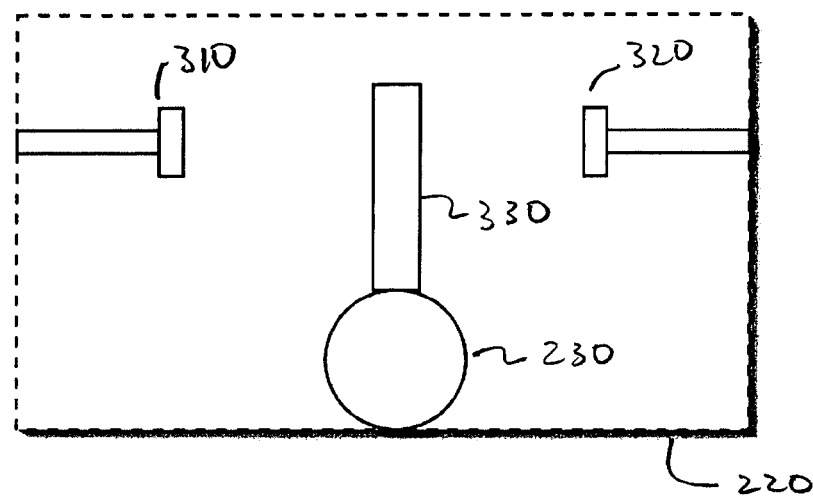
FIG. 3A is a diagram of a contact sensor indicating when an optical navigation device is in contact with a surface, in accordance with one embodiment of the present invention.

FIG. 3A is a cross sectional diagram of the contact sensor 210 of FIGS. 2A and 2B, in accordance with embodiments of the present invention. The contact sensor is incorporated into the design of the optical navigation device to provide skating functionality. The contact sensor includes a mechanical switch, in one embodiment. In another embodiment, the contact sensor includes an optical switch. In still another embodiment, the contact sensor includes an electronic switch.

As shown in FIG. 3A, the contact sensor 210 indicates when the optical navigation device is in contact with the corresponding surface (e.g., the transparent layer 150) to provide continuous tracking functionality for the optical navigation device 110 of FIG. 1. For instance, the position of the mechanical linkage within the body of the optical navigation device 110, such that the mechanical linkage 230 does not extend beyond the bottom face 220, indicates that the optical navigation device 110 is in contact with the corresponding surface (e.g., transparent surface).

The contact sensor 210 includes an optical sensor 210 within the body of the optical navigation device, in accordance with one embodiment. For instance, the optical sensor 210 includes an optical transmitter 310 for transmitting an optical signal. In addition, the optical sensor 210 also includes an optical detector 320 for receiving the optical signal over an optical path between the transmitter 310 and the detector 320.

Also, an opaque element (e.g., a vane) 330 is shown blocking the optical path between the transmitter 310 and the detector 320. The vane 330 blocks the optical path when the optical navigation device is in contact with corresponding surface (e.g., transparent layer). That is, the mechanical linkage is forced upwards into the body of the contact sensor 210 and optical navigation device 110 through contact with the transparent layer, for example. Since the mechanical linkage is coupled to the vane 330, the vane is also forced upwards and thus blocks the optical path between the transmitter 310 and the detector 320. In this position, an enable signal is generated that indicates the optical navigation device should continue tracking across the reflective surface.

Figure 3B:
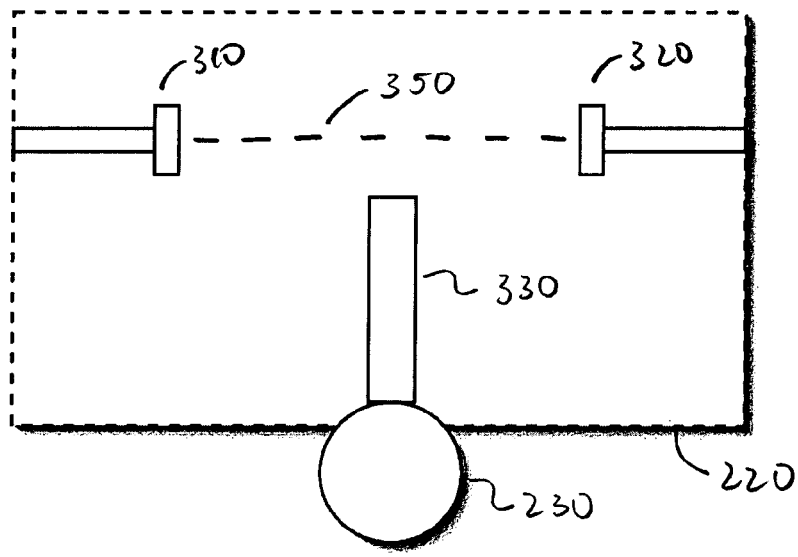
FIG. 3B is a diagram of a contact sensor indicating when an optical navigation device is not in contact with, or lifted off, a surface, in accordance with one embodiment of the present invention.

As shown in FIG. 3B, the contact sensor 210 indicates when the optical navigation device is not in contact with the corresponding surface (e.g., the transparent layer 150) to provide skating functionality for the optical navigation device 110 of FIG. 1. For instance, the position of the mechanical linkage 230 extruding outside of the body of the optical navigation device 110, such that the mechanical linkage 230 extends partly or fully beyond the bottom face 220, indicates that the optical navigation device 110 is not in contact with the corresponding surface (e.g., transparent surface). That is, the mechanical linkage is forced into a position that extends beyond the bottom face 220 of the optical navigation device (e.g., through a spring, spring arm, etc.) when no upward force into the body of the optical navigation device 110 on the mechanical linkage 230 is applied. In this position, a disable signal is generated that indicates the optical navigation device should hold the previous navigational data output constant and not generate any new navigational data as long as the disable signal is present. This allows the device to be skated across the reflective surface.

In FIG. 3B, the vane 330 is not blocking the optical path 350 between the transmitter 310 and the detector 320. That is, the vane 330 does not block the optical path 350 when the optical navigation device is not in contact with corresponding surface (e.g., transparent layer). More specially, the mechanical linkage is forced downwards out beyond the bottom face 220 of the optical navigation device 110, for example. Since the mechanical linkage is coupled to the vane 330, the vane is also forced downwards and thus opens the optical path between the transmitter 310 and the detector 320.

Alternatively, lift of the optical navigation device from a corresponding surface is detected from a capacitive change between two electrodes within the optical sensor 210, in accordance with one embodiment of the present invention. That is, the optical sensor includes a capacitance switch that includes a first electrode and a second electrode. FIGS. 3A and 3B can be used to illustrate the capacitance switch, in which the first electrode is represented at 310 and the second electrode is represented at 320. A capacitive sensor measures the capacitance between the two electrodes 310 and 320. The capacitive sensor will measure different capacitance values depending on the influence of the vane 330. As such, the capacitive sensor is able to determine when a capacitance change occurs between the first electrode and the second electrode. Depending on the type of change, based on the capacitance values measured, the capacitive sensor is able to determine when the optical navigation device is in contact with the transparent layer, for example, and when the optical navigation device is no longer in contact with the transparent layer, for example.

In still another embodiment, the optical navigation device 110 includes a mechanical switch for indicating when there is contact with the corresponding surface (e.g., the transparent surface), or when there is no contact with the corresponding surface.

Figure 4:
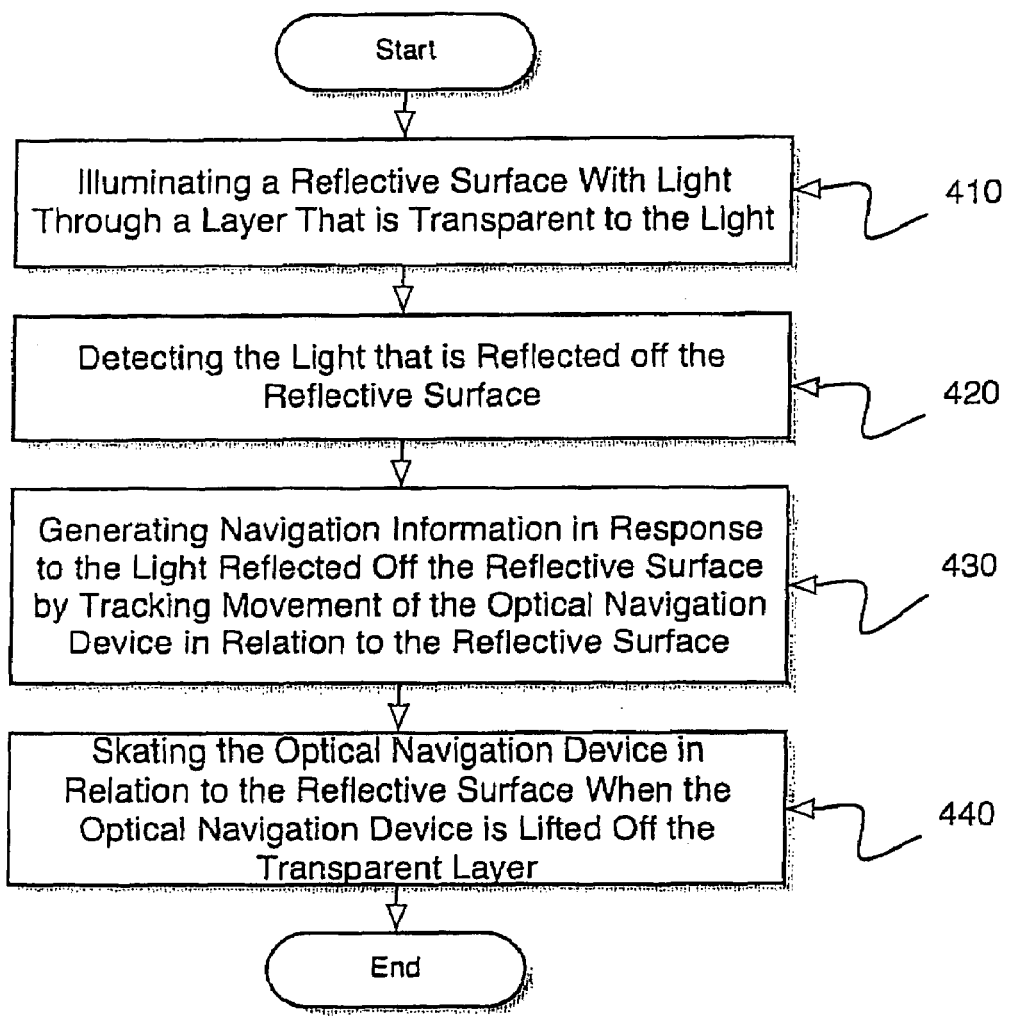
FIG. 4 is a flow chart illustrating steps in a method for generating navigation information through a transparent layer with skating functionality, in accordance with one embodiment of the present invention.

FIG. 4 is a flow chart 400 illustrating steps in a computer implemented method for generating navigation information by an optical navigation device through a transparent layer, in accordance with one embodiment of the present invention. The present embodiment is able to incorporate an optical navigation device with a longer depth of field with an auxiliary contact or proximity sensor to allow continuous tracking and skating functionality over any intermediary optically transparent surface that separates a reflective surface from the optical navigation device.

At 410, the present embodiment illuminates a reflective surface with light through a layer that is optically transparent to the light. More specifically, a light source (e.g., LED or laser) emits a light that passes through the transparent layer and reflects off the reflective surface. As such, the optical navigation device is configured such that a depth of field associated with the optical navigation device accommodates a desired range of positions for the reflective surface relative to a sensor receiving the light that is reflected. In one embodiment, the aperture of the optical navigation device is configured so that light reflected off reflective surface is able to reach the sensor. In another embodiment, lenses are configured to focus reflective light from the correct range of positions that includes the reflective surface.

At 420, the present embodiment detects light that is reflected off the reflective surface. The light is detected at an imaging sensor. As such, successive images of the reflective surface can be generated as the optical navigation device is moved across the second, transparent surface.

At 430, the present embodiment generates navigation information in response to the light reflected off the reflective surface by tracking movement of the optical navigation device in relation to the reflective surface. More specifically, the imaging sensor of the present embodiment is able to identify common textual features between successive frames and calculate a distance between the features in order to indicate corresponding movement of the optical navigation device.

At 440, the present embodiment is able to allow the optical navigation device to be skated over the underlying surfaces. For instance, the present embodiment is able to detect when the optical navigation device is lifted off the transparent layer, and in response, disable the continuous tracking movement of the optical navigation device. That is, the skating function is enabled.

In one embodiment, a change in capacitance between a first electrode and a second electrode in the optical navigation device indicates that the optical navigation device has been lifted off the corresponding surface. In this case, the capacitance has one constant value when the optical navigation device is in contact with the corresponding surface (e.g., the transparent layer) but changes to a new value or range of values when the device is lifted.

Correspondingly, the present embodiment is also able to detect when the optical navigation device is in contact with the transparent layer, and in response enable the continuous tracking of the optical navigation device in relation to the reflective surface.

Accordingly, embodiments of the present invention provide for an optical navigation device having a greater depth of field and a contact sensor to allow for continuous tracking and skating functionality over reflective surfaces that are separated from the optical navigation device by a layer of smooth, transparent material, such as glass.

While the methods of the embodiment illustrated in flow chart 400 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

A system and method for an optical navigation device configured to generate navigation information through a transparent layer with skating functionality is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed is:

1. An optical mouse, comprising:
a light source configured to illuminate a reflective surface through a layer that is optically transparent to said light source;
a sensor configured to generate navigation information in response to light from said light source being reflected from said reflective surface; and
a contact sensor operably connected to said sensor and configured to provide a disabling signal thereto when said mouse is not in contact with said layer, the sensor being configured to suspend navigation upon receiving the disabling signal and to resume or continue navigation upon: (a) not receiving the disabling signal, or (b) receiving an enabling signal from said contact sensor;
wherein said light source and said sensor are configured to provide a depth of field sufficiently large to permit navigation of the mouse in respect of said reflective surface despite the presence of said layer between the mouse and the reflective surface.

2. The optical mouse of claim 1, wherein said light source is configured to be transparent to said layer that comprises glass.

3. The optical mouse of claim 1, wherein said light source comprises a laser.

4. The optical mouse of claim 3, wherein said light source comprises a VCSEL.

5. The optical mouse of claim 1, wherein said sensor comprises a CMOS imager.

6. The optical mouse of claim 1, wherein said contact sensor further comprises:
an optical transmitter for transmitting an optical signal;
an optical detector for receiving said optical signal over an optical path; and
a vane that blocks said optical path only when said optical mouse is in contact with said layer.

7. The optical mouse of claim 1, wherein said contact sensor comprises a mechanical switch.

8. The optical mouse of claim 1, wherein said contact sensor comprises a capacitance switch comprising:
a first electrode;
a second electrode;
a capacitive sensor that determines a capacitance change between said first electrode and said second electrode indicating when said optical mouse is no longer in contact with said layer.

9. An optical mouse, comprising:
means for illuminating a reflective surface with light through a layer that is optically transparent to said light;
means for detecting said light being reflected from said reflective surface;
means for generating navigation information in response to said light being reflected from said reflective surface by tracking movement of said optical mouse in respect of said reflective surface; and
means for suspending or continuing navigation in response to said optical mouse not being in contact with said layer, and being in contact with said layer, respectively;
wherein said illuminating means and said detecting means are configured to provide a depth of field sufficiently large to permit navigation of said mouse in respect of said reflective surface despite the presence of said layer between the mouse and the reflective surface.

10. The optical mouse of claim 9, wherein said means for illuminating a reflective surface comprises a laser.

11. The optical mouse of claim 9, wherein said light sensor comprises one of a one-dimensional sensor array, a two-dimensional sensor array, and a single sensor.

12. The optical mouse of claim 9, wherein said suspending or continuing navigation means comprises one of a mechanical switch, an optical switch, a capacitive switch, and an electronic switch.

13. The optical mouse of claim 9, further comprising:
an optical aperture configured to be disposed between said layer and said light detecting means.

14. A method of navigating an optical mouse in respect of a reflective surface located beneath a transparent layer disposed between the mouse and the reflective surface, comprising:
providing p depth of field respecting alight source and a light sensor disposed on or in said mouse, the depth of field being sufficiently large to permit navigation of said mouse in respect of said reflective surface despite the presence of said layer between the mouse and said reflective surface;
illuminating said reflective surface with light originating from said light source and transmitted through said layer;
detecting said light reflected from said reflective surface with said sensor;
generating navigation information with a processor in response to detecting light reflected from said reflective surface by tracking movement of said optical mouse in respect of said reflective surface; and
suspending or continuing navigation in response to said optical mouse not being in contact with said layer and being in contact with said layer, respectively.

15. The method of claim 14, further comprising:
providing an aperture between said layer and said light sensor.

16. The method of claim 14, wherein a disabling signal is provided to said processor by a contact sensor when said mouse disengages from said layer, the disabling signal causing navigation to be suspended.

17. The method of claim 14, wherein an enabling signal is provided to said processor by a contact sensor when said mouse engages said layer, the enabling signal causing navigation to continue or resume.

18. The method of claim 16, wherein said contact sensor determines a change in capacitance between a first and second electrode, said capacitance being constant when said optical mouse engages said layer.

* * * * *

UNITED STATES PATENT AND TRADEMARK OFFICE
CERTIFICATE OF CORRECTION

PATENT NO.        : 7,399,954 B2                                                                  Page 1 of 1
APPLICATION NO.   : 11/204913
DATED             : July 15, 2008
INVENTOR(S)       : Shalini Venkatesh It is certified that error appears in the above-identified patent and that said Letters Patent is hereby corrected as shown below:

Column 10, Line 20, Claim 14, delete "a transparent" and insert -- an optically transparent --;

Column 10, Line 23, Claim 14, delete "p" and insert -- a --;

Column 10, Line 34, Claim 14, delete "information" and insert -- information, --.

Signed and Sealed this

Seventh Day of December, 2010

David J. Kappos
*Director of the United States Patent and Trademark Office*